United States Patent
Gerard et al.

(10) Patent No.: US 10,706,433 B2
(45) Date of Patent: Jul. 7, 2020

(54) INDIVIDUAL LEVEL LEARNING MECHANISM

(71) Applicant: MASTERCARD INTERNATIONAL INCORPORATED, Purchase, NY (US)

(72) Inventors: Jean Pierre Gerard, Croton-On-Hudson, NY (US); Shen Xi Meng, Millwood, NY (US); Po Hu, Norwalk, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 620 days.

(21) Appl. No.: 15/415,664

(22) Filed: Jan. 25, 2017

(65) Prior Publication Data
US 2018/0211267 A1    Jul. 26, 2018

(51) Int. Cl.
*G06Q 30/02* (2012.01)

(52) U.S. Cl.
CPC ..... *G06Q 30/0202* (2013.01); *G06Q 30/0205* (2013.01)

(58) Field of Classification Search
None
See application file for complete search history.

(56) References Cited

U.S. PATENT DOCUMENTS

| | | | |
|---|---|---|---|
| 2007/0271141 A1* | 11/2007 | Storm | G06Q 20/20 705/16 |
| 2014/0222506 A1* | 8/2014 | Frazer | G06Q 30/02 705/7.29 |
| 2017/0061484 A1* | 3/2017 | Jen | G06Q 30/0255 |

OTHER PUBLICATIONS

G. Silahtaroğlu and H. Dönertaşli, "Analysis and prediction of E-customers' behavior by mining clickstream data," 2015 IEEE International Conference on Big Data (Big Data), Santa Clara, CA, 2015, pp. 1466-1472. (Year: 2015).*

* cited by examiner

*Primary Examiner* — Matthew S Gart
*Assistant Examiner* — Camille M Galloway
(74) *Attorney, Agent, or Firm* — Foley & Lardner LLP

(57) ABSTRACT

Disclosed herein are systems and methods of individual level learning that include receiving purchase event data from a merchant device that indicates that a purchase event occurred by a user on a user device, and transmitting the purchase event data to an analytics server. The methods may also include processing the purchase event data. The processing may include calculating a time gap for each of two sequential purchase events in a list of purchase events, and calculating an average duration of consecutive events by averaging all of the purchase events in the list of purchase events. The method may determine a purchase hazard probability that a purchase event will occur on a given day, when the average duration of consecutive events is larger than a standard deviation of the event occurring. When the purchase hazard probability is above a threshold, the system may push a message to the user device.

9 Claims, 5 Drawing Sheets

INDIVIDUAL LEVEL LEARNING MECHANISM

TECHNICAL FIELD

This application relates generally to information systems and more specifically to dynamically generating and manipulating datasets associated with analytics processing.

BACKGROUND

Current methodologies of tracking consumer patterns commonly rely upon patterns based on similarity between users. For example, when several users like a video on social media or purchase the same product, then other users may be likely to enjoy the same video or buy the same product. Similar patterns of purchasing across different payment types may also help in learning consumers' habits.

Some conventional approaches collect data from groups of individuals in order to understand common behaviors. These approaches use statistical confidence and modeling to predict future acts. Approaches using groups of individuals also use machine learning techniques to predict future purchases. Machine learning mechanisms used may include artificial neural networks, inductive logic programming, and deep learning. Statistical methods and predictions are also commonly relied upon during predicting behavior.

Some current methodologies are limited to group behavior patterns. Group behavior patterns lack the specificity that indicates whether a user will make a purchase or will perform a specific behavior in real-time. For example, some techniques use one or more variables to track different purchases over time within a category. For example, these techniques attempt to track all shoppers at a certain grocery store within several variables. The variables may indicate different product groups, different individual products, and different groups of shoppers.

Each individual may make purchases at different frequencies. For example, shoppers may purchase at a frequency depending on a particular shopper's lifestyle. One person living in the middle of a city may purchase food every few days from a grocery store. Another person living in a rural area may shop less frequently, such as once a month. Shopping habits for clothing may similarly differ by shopper. One person might buy clothes every week, while another person may purchase clothing once a year.

In a group learning example, a grocery store may accumulate data on all customer purchases for different categories. The store may organize the data by product category, such as produce, deli, health care, cleaning supplies, etc. Similarly, the store may organize the data by individual products, such as toothpaste, waffles, chicken, and laundry detergent. Many consumer tracking mechanisms use data that aggregates data from several customers. Therefore, these methods cannot easily predict what individual customers want and when they will want it. Thus, there is a need to more accurately predict individual user's needs in a timely manner.

SUMMARY

Disclosed herein are systems and methods capable of addressing the above-described shortcomings and may also provide any number of additional or alternative benefits and advantages. In some embodiments, a system is capable of predicting on an individual level the likelihood of a repeat event. For example, the system may track each occurrence of one type of a user's purchase events and determine the likelihood that that event will occur again on a given day.

In one embodiment, a computer-implemented method comprises receiving, by the analytics server, purchase event data from a merchant server that indicates an occurrence of a purchase event for a user, wherein the analytics server stores event data associated with the user and an identifier of a user device associated with the user; calculating, by the analytics server, a time gap for each of two sequential purchase events in the purchase event data, where the time gap is a difference in time from when one purchase event occurs to when a subsequent purchase event occurs; calculating, by the analytics server, an average duration of consecutive events by averaging all of the time gaps for the purchase events in the purchase event data; determining, by the analytics server, a purchase hazard probability that a purchase event will occur on a given day when the average duration of consecutive events is larger than a standard deviation of the event occurring; obtaining, by the analytics server, a location of the user device with respect to a location associated with a particular merchant; and when the purchase hazard probability satisfies a threshold and the location of the user device is in the location associated with the particular merchant, generating, by the analytics server, instructions to transmit a message to the user device involving the purchase event based on the stored identifier of the user device.

In another embodiment, a computer-implemented method for embedding content on a web page comprises receiving, by an analytics server from a web server, event data representative of an activation of a link on a web page by a user, where the web page is partitioned into a plurality of segments and the event data comprises an identifier of a segment of the plurality of segments; calculating, by the analytics server, a time gap for each of two sequential events in the event data, where the time gap is a difference in time from when one event occurs to when a subsequent event occurs; calculating, by the analytics server, an average duration of consecutive events by averaging all of the time gaps for the events in the event data; determining, by the analytics server, a hazard probability that an event associated with the same segment will occur on a given day when the average duration of consecutive events is larger than a standard deviation of the event occurring; determining, by the analytics server, that the user has loaded the web page on the user's device; when the hazard probability is above a threshold and when the user has loaded the web page, instructing, by the analytics server, the web server to embed content data associated with the segment in the event data in a container on the web page.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
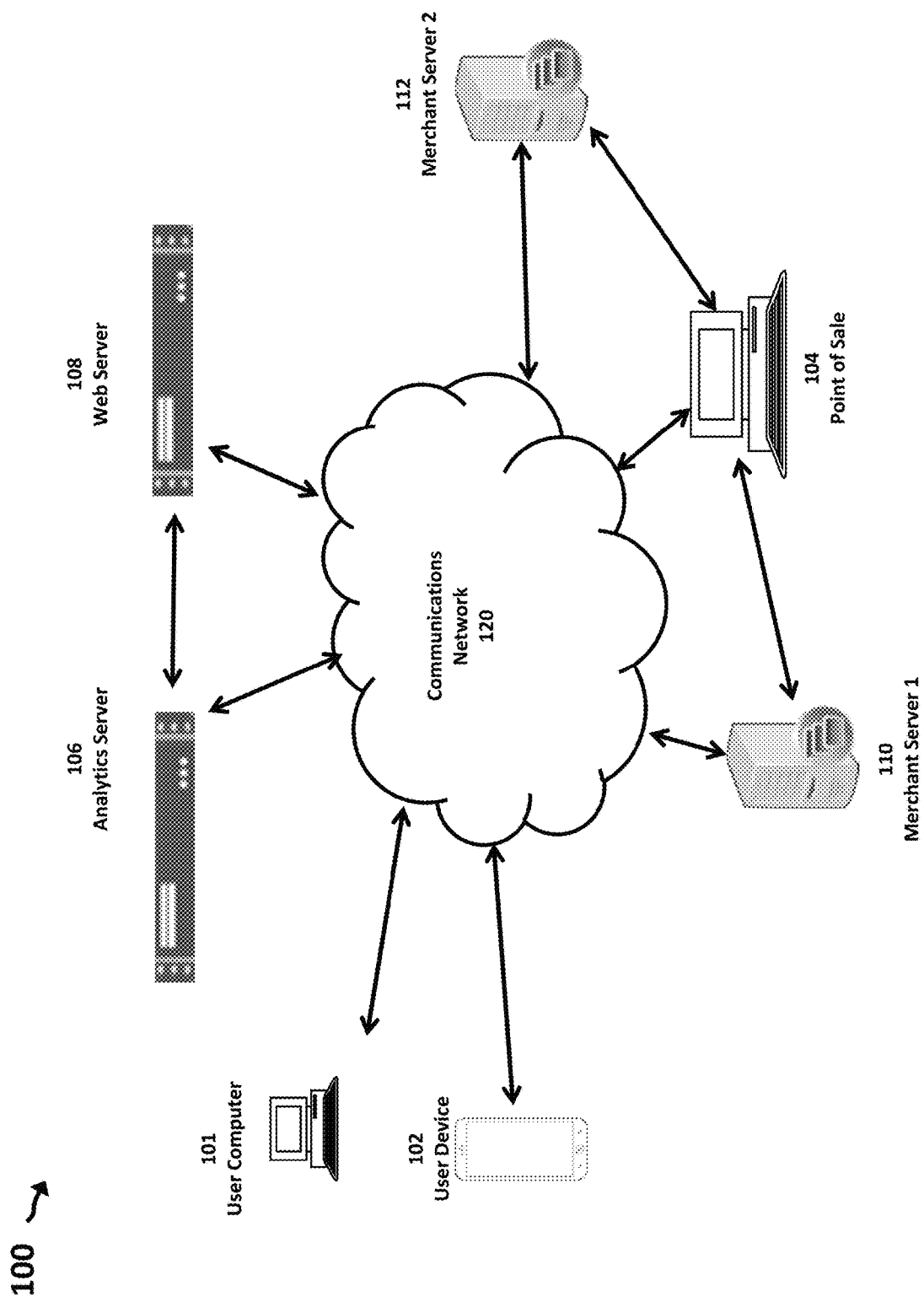
FIG. 1 illustrates components of an exemplary system, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments may include individual user level learning mechanisms and devices for predicting user behavior patterns based on events (e.g., prior purchasing habits and frequency), then the system may predict when a user may conduct a similar action again (e.g., purchase the same type of product). An event may be a user action, including clicking a link on a website, visiting a website, a transaction (e.g., purchasing a product, using a payment card), or a similar action where the system attempts to predict that action or a similar action is going to occur again. Events may be grouped, e.g., transactions can be grouped by purchases within a product category (e.g., deli, frozen foods, health care, cleaning products), purchases of products of the same stock keeping unit (SKU), or purchases of the same product group level. For example, a product category may be food, clothes, travel, and electronics. The grouping of events may also have sub-groupings.

In an embodiment involving a purchase of a product, an analytics server may collect data related to each time a user purchases various products. The analytics server may store the data in a database. The purchased products may be associated with different categories. For example, a tooth brush purchase may be associated with a specific SKU, a health care category, and a grocery store category. The system inputs a series of events into an algorithm that determines the likelihood or probability of the event happening again in a future time window. The algorithm may use average duration of consecutive events and the standard deviation of the event occurrences. Further embodiments may also account for the likelihood of one event occurring once another event has occurred.

In some embodiments, the analytics server may output a likelihood of the event occurring. When a threshold likelihood is satisfied, the analytics server in communication with a web server may send a message to a merchant server. The merchant server may send a message or an alert to the user's device. For example, the merchant server may transmit a marketing message or advertisement in real-time upon identifying that a user's device is located in a store or in proximity to a store. Similarly, the merchant server may transmit to the user directions to a store when the analytics server has determined the user's device's location. The transmitted directions may comprise instructions to a mapping application on the user's device.

FIG. 1 illustrates components of an exemplary system 100. Exemplary system 100 may include user computer 101, user device 102, point of sale terminal 104, analytics server 106, web server 108, merchant servers 110, 112, and communications network 120. It will be understood that a variation on the organization and number of devices is within the scope of consideration of exemplary system 100.

Communications network 120 may be any communications network that connects the various devices in exemplary system 100. Communications network 120 may be the internet, a Local Area Network (LAN), a Wide Area Network (WAN), an Internet Protocol (IP) system and/or a wireless communications network such as Global System for Mobile communications (GSM). Different parts of communication network 120 may use different technologies. For example, user computer 101 may connect via a LAN to communications network 120, while analytics server 106 connects through a WAN. Similarly, user device 102 may connect through GSM or another Long Term Evolution (LTE) technology over a wireless telephone communications, while communications network 120 switches the GSM connection to a wired cable connection to be used by merchant server 110.

User computer 101 may be any laptop, tablet, workstation, terminal, smart phone, mobile phone, smart watch, gaming console, or personal computer, whether wired or wireless (e.g., mobile). User computer 101 may be used by a user where data from user computer 101 may be sent over communication network 120 to analytics server 106 and/or web server 108. A user may use user computer 101 to access merchant server 110 in order to buy a product. The user computer 101 may connect via communication network 120 to access a website to view content or purchase an item.

User may use a mobile user device 102. For example, user device 102 may be a cellphone, smart phone, smart watch, or tablet that includes a Geographical Positioning System (GPS) chip or other location-based services. User device 102 may connect to one of merchant servers 110, 112 when facilitating a purchase of an item online using a browser or application of the user device. For example a user device may load a website configured for the user to purchase an item. One of merchant servers 110, 112 may store the website and transmit the contents of the website to the user device 102 for rendering in a browser or on an application of the user device 102. Web server 108 may receive payment information from merchant server 110 when the user makes a purchase via the merchant's website. Web server 108 may then store the purchase event data in a local memory or a database associated with the web server 108. Similarly, web server 108 may transmit the purchase event data to analytics server 106. The analytics server 106 may request the purchase event data from the web server 108, or the web server 106 may initiate the transmission to the web server 108.

User computer 101 and user device 102 may provide location information via any of several mechanisms to web server 108. In one example, the user computer 101 may identify its location using an IP address or a stored profile of the user. In another example, user registration for a mobile subscriber on a GSM system may indicate to web server 108 that the user device 102 is within a certain region. Similarly, a medium access control (MAC) address of the user device 102 may be registered on a local Wi-Fi network.

In an embodiment where the system attempts to determine whether a user associated with the user device 102 is likely conduct a particular action (e.g., transaction using the user device 102), the system may use the location of the user device 102. In this example, the Wi-Fi network may be associated with a location of a point of sale terminal 104 at a merchant where the user of the user device 102 is shopping. A server, such as merchant server 110 or merchant server 112, communicatively coupled to the point of sale terminal 104 may then communicate with web server 108 to notify the web server 108 that the user is currently at the point of sale terminal 104. Merchant servers 110, 112 may gather and store location information of the user device 102. Merchant servers 110, 112 may receive location information through user device's IP address and/or IP packet header origin designation. Merchant server 110, 112 may then submit the identified location information to web server 108, which then transmits data to the analytics server 106 for processing and determining likelihood of the user conducting a particular transaction (e.g., purchasing a particular product or conducting a certain action on a web site).

Analytics server 106 may include one or more databases that are used to store user's event data. Analytics server 106 may analyze user's behavior patterns based on the user's event data. Analytics server 106 may be configured to perform any of the algorithms described herein. Similarly, analytics server 106 may collect data related to events, including data such as time, date, action, price, and location. For example, analytics server 106 may store data related to when a user purchases a specific product, such as toothpaste, jeans, travel, etc. Analytics server 106 may further track information related to when a user activates (e.g., clicks) on certain links on a website. Analytics server 106 may also store user click patterns.

Analytics server 106 may be in communication with web server 108 via a LAN. Analytics server 106 and web server 108 may share information related to a user or their purchase habits (e.g., event data or processed event data). For example, if a user purchases certain items at different times, then those purchase times may be stored on web server 108 or in a database associated with web server 108. Analytics server 106 may communicate with web server 108 to query, gather, store, and analyze the user event data. Web server 108 may be used for storing payment and account information for the user. In one example, a user may try to make a purchase with user device 102 on a website that is hosted by merchant server 110. Merchant server 110 may provide user device 102 with the content for the website to render on the user device 102. Upon completing the transaction, merchant server 110 may communicate with web server 108 for verification of the user's payment information. When completing the transaction, the web server 108 may then store the purchase as an event. The event may be stored locally with day, time, and purchase product information (e.g., SKU, product category, price). The event data may further be shared with analytics server 106 for storage and/or processing. Analytics server 106 may then perform individual level learning upon receiving the event data associated with the purchase.

Analytics server 106 performs individual-level learning to determine a likelihood of another event occurring for the same user. When analytics server 106 determines that another event is likely to happen, then the analytics server 106 may provide this information to web server 108. Web server 108 may then transmit a message to user computer 101 or user device 102 over communications network 120. Similarly, web server 108 may embed information on user computer 101 or user device 102. In another example, web server 108 may provide user computer 101 or user device 102 with directions (e.g., to a merchant location) or an alert. When providing directions, the transmission may comprise instructions to launch a map application or website showing directions from the user's location to the merchant's location. When providing an alert, the transmission may comprise an e-mail, text message, or instructions to cause an application to generate a notification on the user computer 101 or user device 102. In alternative embodiments, the analytics server 106 can perform similar functions as web server 108 with respect to message transmission, embedding information, and generating content for display on user computer 101 or on user device 102.

Figure 2:
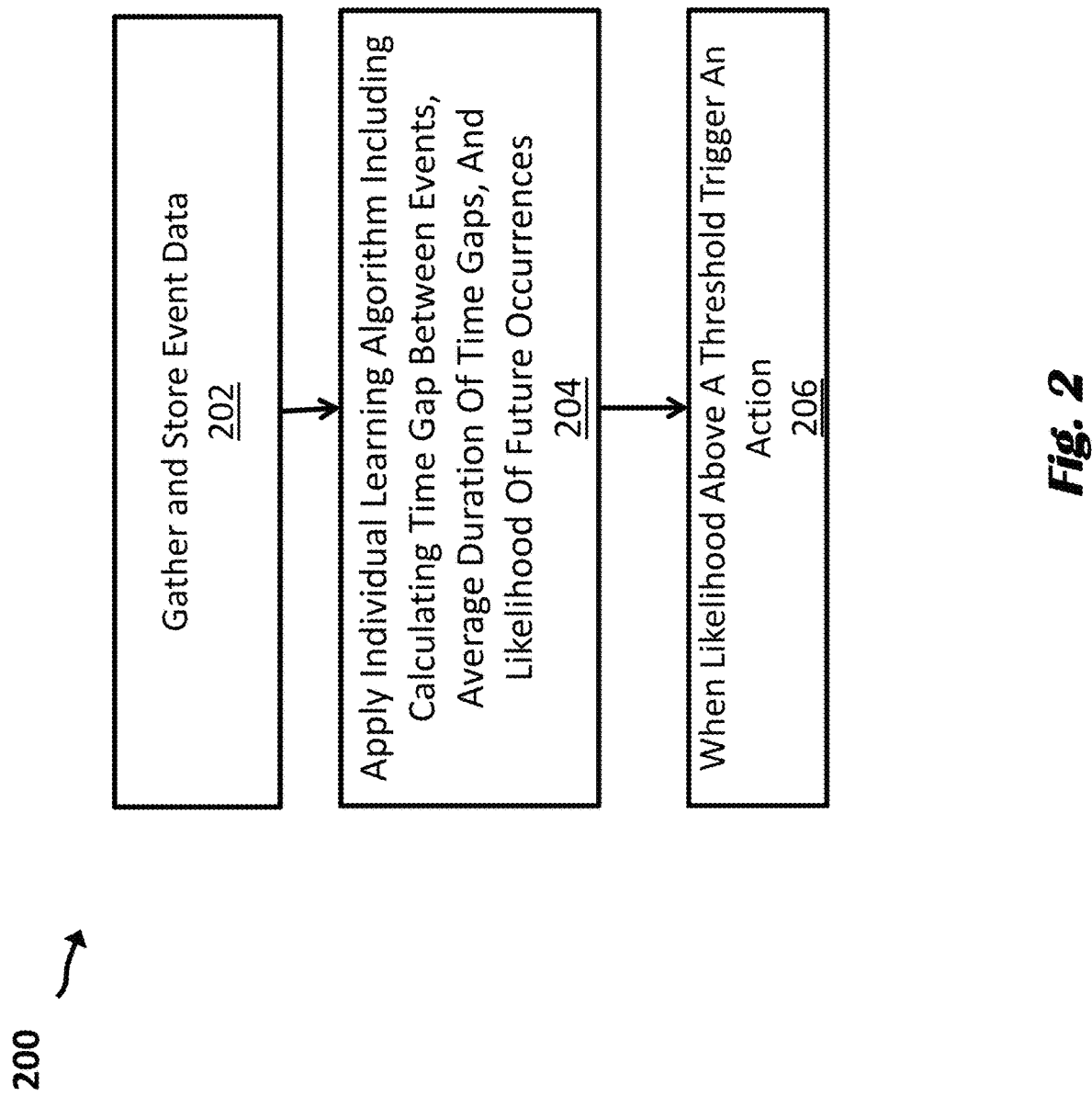
FIG. 2 illustrates a method of individual level learning, according to an exemplary embodiment.

FIG. 2 illustrates a method of individual level learning, according to an exemplary embodiment 200. The analytics server, described above, may perform the steps shown in this illustrated method. In some embodiments, a web server may operate in conjunction with the analytics server or in the place of the analytics server.

In step 202, the analytics server may first collect data from a user from a user computer or user device. The analytics server may store the date and time of each event in a database record associated with the event. In one embodiment, the data may include frequency of purchases by the user of different products. In another embodiment, data may further include information related to click patterns, such as when a user activates (e.g., clicks, touches, selects) a hyperlink on a website. The analytics server may also track which segments of a webpage have the activated hyperlink in each event.

The analytics server may receive data from a merchant server or a point of sale terminal. For example, when a user completes a purchase at a point of sale terminal, the merchant server receives the purchase information and transmits a message to the analytics server notifying the analytics server of the date, time, product, and identity of the purchaser. The point of sale terminal may be positioned at a brick-and-mortar store (e.g., clothing store or gas station). The point of sale terminal may request verification of payment through a web server. The web server may then either store the data as event data or transmit the data to analytics server for storage.

The method may then proceed to step 204, where individual-level learning mechanisms are applied. In some embodiments, the analytics server may store data for all events for an individual using sequence data for a time series of events according to:

$$E = \{A_{t_1}, B_{t_2}, \ldots, C_{t_i}, \ldots, A_{t_j}, A_{t_{i+1}}, \ldots, B_{t_j}, \ldots, A_{t_j}, B_{t_k}, \ldots\}.$$

In this equation A, B, and C are different event types, and subscript t indicates event times. In some embodiments, the analytics server may focus on repeat events, such as when a particular merchant is visited, when a particular product is purchased, when a hyperlink is activated, or when a hyperlink in a segment of a website is activated. In some embodiments, events A, B, and C may indicate a merchant category. Accordingly, the analytics server may estimate when an event might happen in a future time window (e.g., day, week, month, quarter of a year). Probability P that event C will occur in ΔT given the event time series $E_i$ for individual i is given according to:

$$P_i(C, \Delta T | E_i).$$

The analytics server can learn from event data of multiple users. Because each user's event time series is time-based, two users may have the same event series. In some embodiments, for statistical and inference learning, some loss of time sensitivity may be used (e.g., larger date ranges may replace particular dates), and the data may be formatted into a time window having less-sensitive time increments. Using the sample size in this time window, the analytics server can estimate a relationship between occurrences of events, frequency of events, and duration between events in order to predict a subsequent event. In one example, the analytics server may summarize a variable as the number of event A occurrences within the last X months prior to a snapshot date. Depending on the number of types of events, the summarized variable may be defined by the type of event or the time window. The summarized variable may be defined as $x_j$.

The analytics server may use a statistical inference model to build a relationship between the summarized variables with the target event, in a future time window according to:

$$P_i(C,\Delta T)=F(x_1{}^i,x_2{}^i,\alpha,\beta,\ldots).$$

The function F may be a linear or nonlinear function depending upon which modeling approach is used. The function structure and parameters $\alpha, \beta, \ldots$ may be estimated by the similarity of patterns of a learning sample having many users.

The analytics server may lose some detailed information in the time dimension when learning by similarity from a group of users. For example, when repeated events happen to a user, the analytics server may find this event data may be more useful for individual level learning than when the event data is averaged in a sampling learning approach.

The analytics server may estimate at an individual level by determining repeat event impacts. The analytics server may simplify the event series and consider only one of type of event, such as A. For example, with payment card purchases, when event A indicates a merchant category, the repeat event may measure the overall strength of demand of category A by an individual. The analytics server may identify a simplified event series that is a subset of the original set and may contain only category A purchases by an individual according to:

$$\{A_{t_1}, \ldots, A_{t_i} A_{t_{i+1}}, \ldots, A_{t_p}, \ldots\}$$

The analytics server may calculate the duration of consecutive events or time gap between events according to:

$$\Delta t_{Ai}=t_{A,i}-t_{A,i-1}$$

The analytics server may calculate the average duration of consecutive events A according to:

$$\overline{\Delta t(A \mid A)} = \frac{1}{n-1}\sum_{i=2}^{n} \Delta t_{Ai}$$

Further, the analytics server may calculate the standard deviation, $\sigma$ according to:

$$\sigma(A \mid A) = \sqrt{\frac{\Sigma[\Delta t_{Ai} - \Delta t(A \mid A)]^2}{n-2}}$$

When a signal to noise ratio $\overline{\Delta t(A|A)} \gg \sigma(A|A)$ is large enough, then the analytics server may estimate an average hazard or probability H(A) per day (or other time period) that the event will happen. The surviving probability that indicates that the event will not happen may be characterized as $S(T>1)=1-H(A)$.

The analytics server may establish the survival probability to ½ as the average duration:

$$S(T > \bar{t}) = (1 - H(A \mid A))^{\overline{\Delta t(A|A)}} = \frac{1}{2}$$

The analytics server may calculate the average hazard probability per day according to:

$$H(A \mid A) = 1 - \frac{1}{\sqrt[\overline{\Delta t(A|A)}]{2}}$$

In one example, when an average t is 6.66, the hazard probability, H(A|A) is 0.0988. So for each day, the event may have around 10% chance of occurring that day. Assuming the latest transaction date is at $t_l$ and the snapshot, or today's date, is $T_s$, the survival probability D days after the snapshot shot date may be estimated according to the formula:

$$S(A \mid A) = (1 - H(A \mid A))^{(T_S-t_l)+D} = \frac{1}{2^{\frac{(T_S-t_l)+D}{\Delta t(A|A)}}}$$

Further, the probability that the event would happen in the next D days may then be calculated according to:

$$P(A \mid A) = 1 - S(A \mid A) = 1 - \frac{1}{2^{\frac{(T_S-t_l)+D}{t(AA)}}}$$

Table 1 illustrates event data for different users with different average event time T and days of last event happened. The purchase probability of these users are estimated by the above logic that may be computed below:

TABLE 1

| Average between event days T | $T_s - t_l$ | D | H (A\|A) | S (A\|A) | P (A\|A) |
|---|---|---|---|---|---|
| 20 | 13 | 90 | 0.03406 | 0.028164 | 0.971836 |
| 100 | 25 | 90 | 0.00691 | 0.450625 | 0.549375 |

The average hazard H may be improved further by knowledge of different days such as seasonality, holidays, and weekdays. The analytics server may further introduce detailed hazard parameters $H_0, H_w, H_h, H_s, \ldots$ to present hazards as normal weekday, weekend, holiday, and seasonality, etc.

In another embodiment, an event A may be linked by another event B. In some embodiments, the analytics server may consider the pairwise causality that an event B will have an impact to a future event A. A sub time may be constructed that contains only category A and B from the original time series according to:

$$\{A_{t_1}, B_{t_2}, \ldots, A_{t_i} A_{t_{i+1}}, \ldots B_{t_p} \ldots A_{t_p} B_{t_q}, \ldots\}.$$

The analytics server may compute the average time interval and standard deviation $\sigma$ for event A caused by B according to:

$$\overline{\Delta t(A \mid B)} = \frac{1}{n-1}\sum_{i=2}^{n} \Delta t_{AB}$$

$$\sigma(A \mid B) = \sqrt{\frac{\Sigma[\Delta t_{AB} - \Delta t(A \mid B)]^2}{n-2}}$$

The analytics server may calculate the signal to noise ratio according to:

$$\eta(A \mid B) = \frac{\overline{\Delta t(A \mid B)}}{\sigma(A \mid B)}$$

The analytics server may calculate the average hazard from B linked to A according to:

$$H(A \mid B) = \begin{cases} 1 - \frac{1}{\sqrt[\Delta t(A \mid B)]{2}} & \text{if } \eta(A \mid B) > z^* \\ 0 & \text{if } \eta(A \mid B) < z \end{cases}$$

where z is a cut-off value under which the null hypothesis H=0 is not rejected. Combining with the repeat event impact, the analytics server generates a hazard matrix such as:

$$H = \begin{Bmatrix} H(A \mid A) & H(A \mid B) & H(A \mid C) \\ H(B \mid A) & H(B \mid B) & . \\ . & , & . \end{Bmatrix}$$

where H(A|B)≠H(B|A). The diagonal elements represent repeats of the same event and present user demands when applied to purchases. The off-diagonal elements represent dependency of other events, which may be sparsely populated.

The analytics server may calculate the likelihood of an event occurring with the methods described above. The analytics server may then proceed to step 206 where the analytics server may determine when the likelihood satisfies (e.g., is above) a threshold. The analytics server may define the threshold as a limit of a minimum likelihood (e.g., 75%, 80%, 85%).

When the likelihood is above a threshold, one of several actions may be triggered. In some embodiments, the analytics server may notify the web server to send a message to the user computer or user device. The message may indicate that a sales event is occurring in a store or that certain products are newly available. The web server may communicate with the point of merchant server, which may manipulate a direct messaging to an application on the user computer or user device. Similarly, the web server may communicate with a merchant server when the event likelihood satisfies the threshold. The web server may transmit data to the merchant server to embed information in a container on a web page that is presented to the user. The embedded information may present a sale opportunity, advertisement, or other information.

Figure 3:
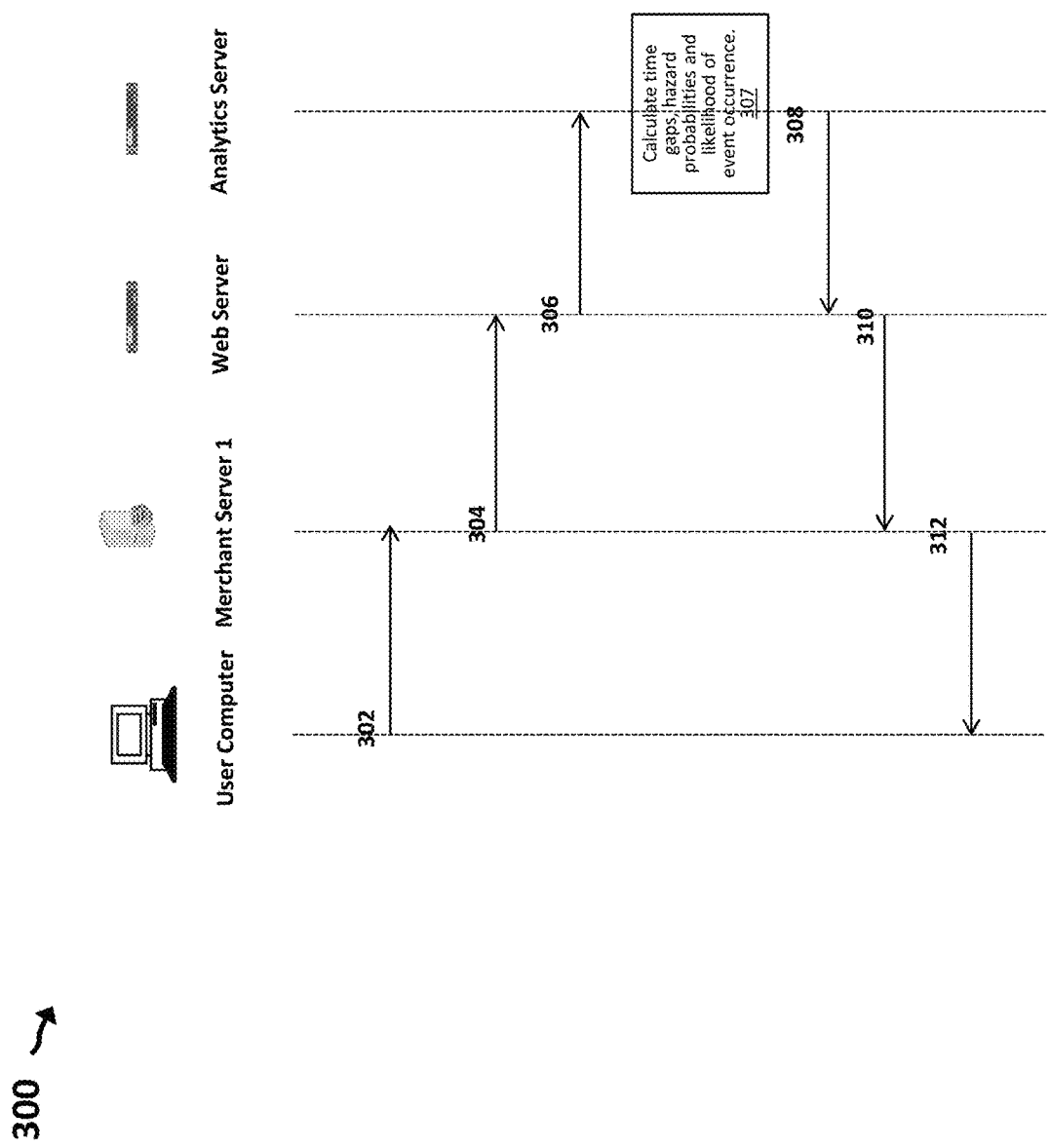
FIG. 3 illustrates a method flow of individual level learning, according to an exemplary embodiment.

FIG. 3 illustrates a method flow of individual level learning, according to an exemplary embodiment 300. In step 302, a user attempts to make a purchase with a user computer via a merchant server. The purchase may be referred to as a purchase event and stored as event data. The user may connect to the merchant server and submit purchase information via a web page. For example, the user computer may first request website data representing products and/or services. When communicating with the merchant server, the user computer may transmit payment information to complete the purchase.

In step 304, the merchant server may transmit purchase event information to the web server. The purchase event information may include date, time, user account information, and payment information of the user. The merchant server may be a server in another location (e.g., another building, another city) that stores website information for an online merchant. Similarly, the merchant server may be in a server rack that includes several servers in communication with each other. For example, the merchant server may be in communication with other merchant servers via a LAN.

The web server may process the purchase event data. In one embodiment, the web server may perform some of the analytics (discussed in FIG. 2) on the purchase event data. In another embodiment, the web server may transfer all of the purchase event data to the analytics server, in step 306.

In step 307, the analytics server may perform all or part of the individual level learning, as described in FIG. 2. The analytics server may create a profile for the user and store this information in a record in a database, which can be associated with historical and current event data. In another embodiment, the analytics server may create a user database and then store user information for each transaction.

The analytics server may calculate the time gap between this purchase event and the previous purchase event for the user. The purchase events' information may be retrieved from the database and/or a list of purchase events. The time gap may be calculated according to the following formula from above:

$$\Delta t_{Ai} = t_{A,i} - t_{A,i-1}$$

where t is the time of a purchase event A at occurrence i.

In step 307, the analytics server may calculate an average duration of consecutive events. The average duration may be calculated according to:

$$\overline{\Delta t(A \mid A)} = \frac{1}{n-1} \sum_{i=2}^{n} \Delta t_{Ai}.$$

Further, the analytics server may determine purchase hazard probabilities that a purchase event may occur on a given day when the signal to noise ratio is large enough, according to a predetermined setting for the signal to noise ratio established in the system. The standard deviation, σ may be calculated according to:

$$\sigma(A \mid A) = \sqrt{\frac{\Sigma[\Delta t_{Ai} - \Delta t(A \mid A)]^2}{n-2}}$$

The purchase hazard probability, H, may be calculated according to:

$$H(A \mid A) = 1 - \frac{1}{\sqrt[\Delta t(A \mid A)]{2}}$$

The hazard probability may indicate the likelihood of an event occurring. In some embodiments, the likelihood of the event occurring on a given day or the same day can be compared to a threshold. For example, when the hazard probability is above 85%, then the analytics server may notify the web server. In step 308, the analytics server may communicate with the web server whether a likelihood of occurrence satisfies the hazard probability threshold.

The analytics server may consider the survival probability in determining the likelihood of a purchase event occurring. The calculations of the likelihood of a purchase event occurring may take a separate event, B, into consideration. For example, the analytics server may have information on different purchase events and determine a likelihood that an event will occur given that a different event already occurred. For example, if a user recently purchased peanut butter, the analytics server may determine that the user is likely due to purchase jelly based on the previous purchases of jelly and the recent purchase of peanut butter.

In step 310, the web server may notify the merchant server that an event is likely to occur. In step 312, the merchant server may transmit (e.g., push) a message to the user computer or user device, such as a notification of a sale or an advertisement message. In another embodiment, the merchant server may embed content onto a web page for rendering on the user computer or user device. For example, the merchant server may send information to the user computer user device about a sale that is currently occurring or will occur shortly. Similarly, the merchant server may communicate with an application being executed or cause the application to be launched on the user computer or the user device.

Figure 4:
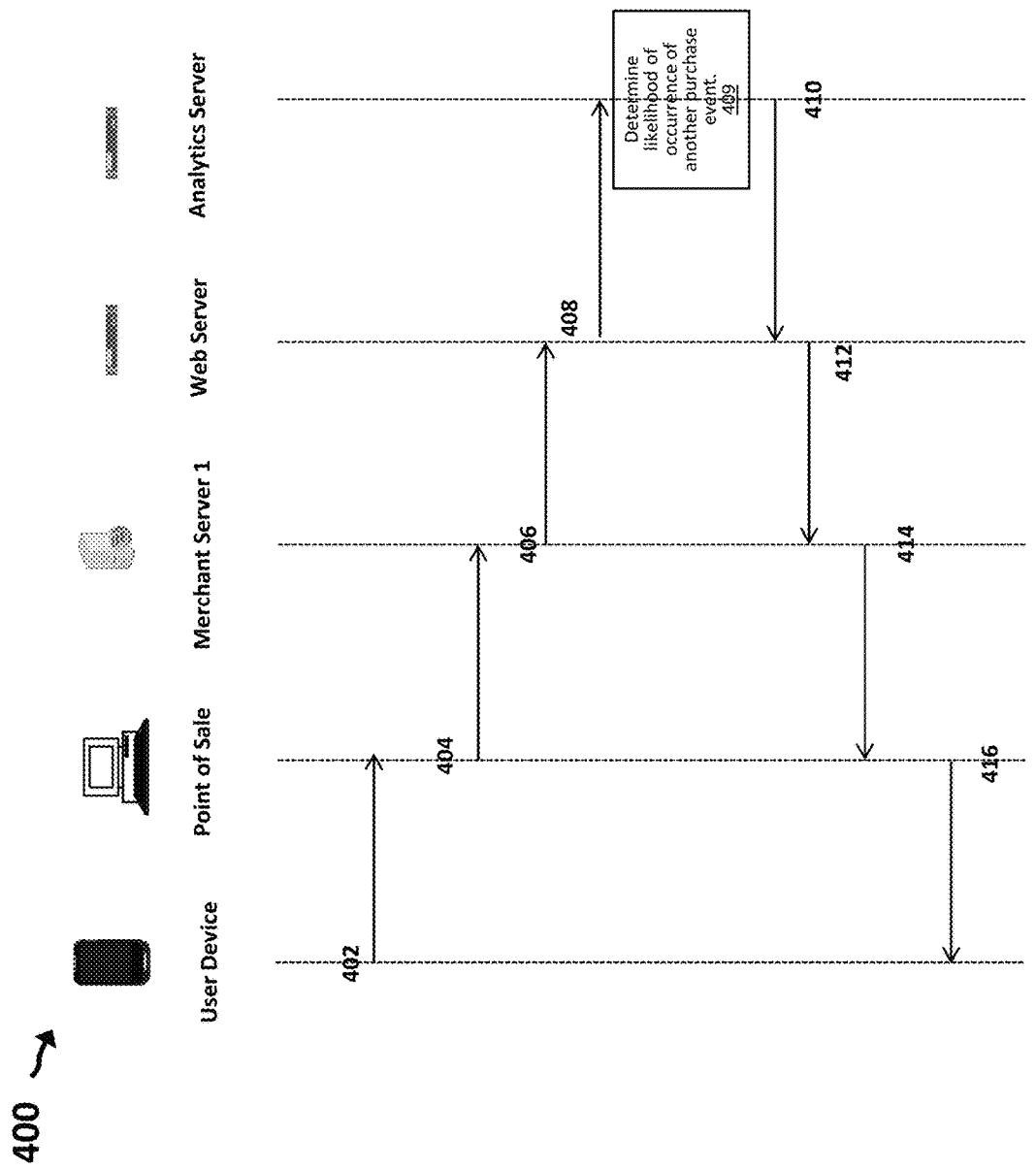
FIG. 4 illustrates a method flow of individual level learning, according to an exemplary embodiment.

FIG. 4 illustrates a method flow of individual level learning, according to an exemplary embodiment 400. In step 402, a user may attempt to make a purchase with a user device at a point of sale terminal. This transaction may be referred to as a purchase event. The user device may include payment card information for one or more of the user's payment accounts. The user device may transmit payment card information to the point of sale terminal at a brick-and-mortar store. The user device can transmit the information using NFC or similar means.

The point of sale terminal receives the payment information from the user device and transmits the payment information to the merchant server, in step 404. The point of sale terminal may transmit date, time, location, amount, and account information for the purchase event to merchant server. The merchant server may be a local server connected by LAN in a server room coupled to the point of sale terminal and configured to store transaction information. The merchant server may then transmit the purchase event data to a web server, in step 406.

The web server receives information related to purchase events. When the web server receives purchase event information, the web server may process the purchase event information, such as by performing one or more steps described in FIG. 2. The web server may then transmit all or part of the purchase event data to the analytics server, in step 408, for some or all of the processing. In step 409, the analytics server executes an algorithm to calculate the purchase hazard probability and whether to send a notification or adjust the content of a website.

In some embodiments, in step 409, the analytics server stores historical information for a user's purchase events. In some embodiments, the analytics server may create a profile for a new user and store the user's information in a record in a database. In another embodiment, the analytics server may create a database having records for different users in order to keep track of their different purchase events. Any kind of data structure may be used to store user's purchase event data including, for example, hashes, linked lists, binary trees, dictionaries, arrays, and classes.

In some embodiments, the analytics server may calculate time gaps for each of two sequential purchase events in a list of purchase events in the database. The time gap may be as defined above or the difference in time from when one event occurs to when a subsequent event occurs. The analytics server may calculate an average duration of consecutive events. In one example, the average duration may be calculated as above and/or by averaging all of the purchase events in the list of purchase events. The analytics server may also determine purchase hazard probabilities that a purchase event may occur on a given day (or other time period).

In other embodiments, analytics server may consider occurrence of another event type when determining the likelihood of occurrence of a purchase event. For example, a primary event may be the purchase of jeans, while a secondary event may be travel. The analytics server may then compare the hazard probability to a threshold. When the hazard probability satisfies this given threshold, the analytics server may notify web server, in step 410. The analytics server may also consider the survival probability when notifying the web server. As discussed above in FIG. 2, the analytics server has numerous considerations for determining when to notify the web server. In some embodiments, consideration of the time of year, seasonality, day of the week, or other factors may be taken into consideration when determining the likelihood of occurrence of a purchase event.

In step 412, the web server may transmit a push notification to the merchant server when the web server receives notice from analytics server that the purchase event likelihood has exceeded a designated threshold. In step 414, the merchant server may transmit the push notification to the point of sale terminal (e.g., a message on the point of sale terminal during the transaction). In step 416, the merchant server may push a notification to user device, which may be done simultaneously with the notification to the point of sale terminal or instead of the notification to the point of sale terminal. The push notification may be a message (e.g., e-mail or text message), an advertisement, information to be embedded in a web page, a communication with an application on user device, instructions for the user device to perform a certain function (e.g., generate directions on a map, launch an application, display a pop-up window or notification message).

Figure 5:
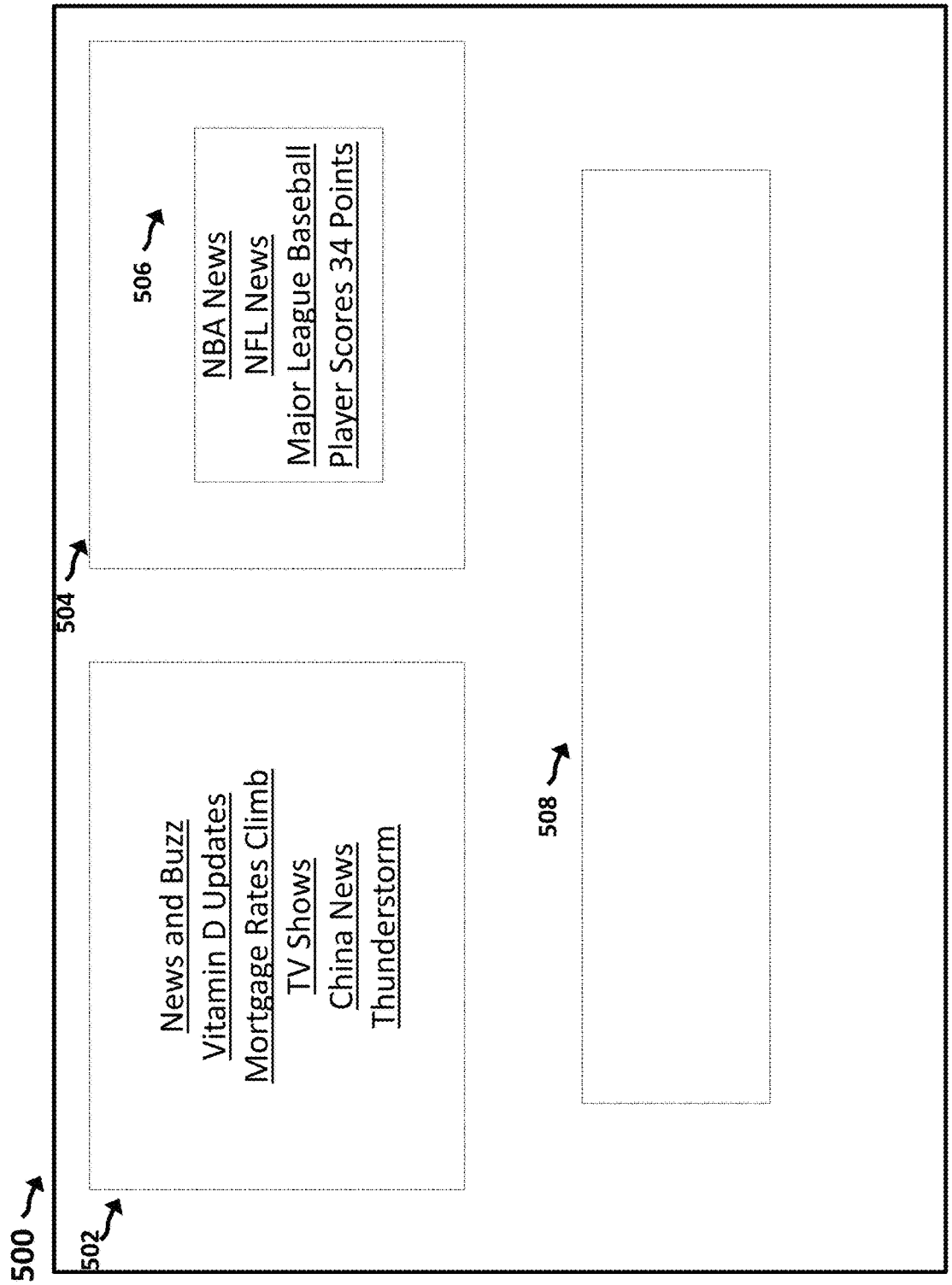
FIG. 5 illustrates an exemplary website for online click pattern analysis, according to an exemplary embodiment.

FIG. 5 illustrates an exemplary website for an online click pattern analysis, according to an exemplary website 500 rendered in a browser on a user computer or user device. The website 500 may be divided into several segments, which may be similar or different sizes from each other. In this example, the website 500 has segments 502, 504. Each segment may have a hyperlink, images, and other content. For example, one segment may have links for sports, news, and art.

In some embodiments, a method may be performed including embedding recommendation content on a web page, such as example website 500. A web server, such as the merchant server, may receive event data representative of an activation of a link on the website 500. The merchant server may transmit the event data associated with the clicked segment to the web server. The web server may transmit the event data to the analytics server, which may perform similar processing as discussed above.

Event data may include a date, time, the hyperlink information, and a segment of the website. The analytics server may calculate the likelihood of another click occurring in that segment of the website. The analytics server may calculate the time gaps between events and the average duration of consecutive events. Further, the analytics server may calculate the hazard probability, survival probability, and likelihood of occurrence given other events occurring. When the hazard probability satisfies a threshold and the user has loaded the web page again on a browser of the user computer or user device, the merchant server may embed data or content on the web page. The merchant server may embed this information into a container 506, for example. Container 506, such as a container class in Cascading Style Sheets (CSS), is an example of a section of the web page that dynamically receive data as the page is being generated or rendered. Container 506 may be a part of segment 502 in one embodiment, while container 506 may be a part of segment 504 in another embodiment.

In the example shown in FIG. 5, segment 504 has links to various sports-related websites (e.g., NBA News, NFL News). Upon determining by the analytics server that a user clicks on links in this segment, the analytics server may determine the hazard probability that the user will click on a link in this segment again. When the likelihood is sufficiently high (e.g., above a threshold) for a particular day, then when the user visits the webpage on that day, the webpage will be rendered with content in a container 508. The content displayed in container 508 may be an advertisement for a sports-related merchant, such a sporting goods store, a ticket seller, or a fantasy sports league. Because the analytics server knows when the user is likely to activate a link in a particular segment of the webpage, the analytics server can customize the webpage and dynamically generate the content for the container based upon the most recent calculation of the hazard probability.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module that may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by the analytics server, purchase event data from a merchant server that indicates an occurrence of a purchase event for a user, wherein the analytics server stores purchase event data associated with the user and an identifier of a user device associated with the user;
executing, by the analytics server, an individual level machine learning algorithm configured to determine event prediction data representative of likelihood of repeat events of the user by applying a neural network to the purchase event data associated with the user, wherein the individual level machine learning algorithm is configured to:
calculate a time gap for each of two sequential purchase events in the purchase event data, where the time gap is a difference in time from when one purchase event occurs to when a subsequent purchase event occurs; and calculate an average duration of consecutive events by averaging all of the time gaps for the purchase events in the purchase event data;

determining, by the analytics server applying the neural network to the purchase event data associated with the user and the event prediction data representative of the likelihood of repeat events of the user, a purchase hazard probability that a purchase event will occur on a given day when the average duration of consecutive events is larger than a standard deviation of the event occurring;

obtaining, by the analytics server, a location of the user device with respect to a location associated with a particular merchant; and when the purchase hazard probability satisfies a threshold and the location of the user device is in the location associated with the particular merchant, generating, by the analytics server, instructions to transmit a message to the user device involving the purchase event based on the stored identifier of the user device.

2. The method of claim 1, further comprising receiving, by the analytics server, a message comprising a location of the user device near a point of sale terminal of the particular merchant.

3. The method of claim 1, wherein the message transmitted to the user device is a text message or email message.

4. The method of claim 1, wherein the analytics server determines the purchase hazard probability the event will occur accounting for at least one of: a season, a weekday, a holiday, and a weekend in which the purchase event occurred.

5. The method of claim 1, wherein the purchase event is a purchase by the user of a product in a product category of a previous purchase.

6. The method of claim 1, wherein the purchase event is a purchase by the user of the same product.

7. The method of claim 1, wherein the purchase event data comprises a stock keeping unit, and the purchase hazard probability comprises the likelihood that the user will purchase a product comprising the stock keeping unit.

8. The method of claim 1, wherein the average duration $\overline{\Delta t(A|A)}$ of a consecutive event A at time t is calculated according to:

$$\overline{\Delta t(A|A)} = \frac{1}{n-1} \sum_{i=2}^{n} \Delta t_{Ai}, \text{ where}$$

$$\Delta t_{Ai} = t_{A,i} - t_{A,i-1}.$$

9. The method of claim 8, wherein the purchase hazard probability, H, is calculated according to:

$$H(A|A) = 1 - \frac{1}{\frac{\overline{\Delta t(A|A)}}{\sqrt{2}}}.$$

* * * * *